United States Patent

Carruth

[11] Patent Number: 6,029,685
[45] Date of Patent: Feb. 29, 2000

[54] CAGE ASSEMBLY FOR BALL CHECK VALVES

[76] Inventor: Don Vernon Carruth, P.O. Box 11367, Midland, Tex. 79702

[21] Appl. No.: 09/231,119

[22] Filed: Jan. 15, 1999

[51] Int. Cl.[7] .............................. F16K 15/00; E03B 1/00
[52] U.S. Cl. ...................... 137/15; 137/533.15; 137/315; 29/890.124; 29/890.131; 29/700
[58] Field of Search ........................... 137/533.11, 533.13, 137/533, 529, 539.5, 315, 318, 15; 251/338, 368; 29/890.12, 890.121, 890.124, 890.131, 700

[56] References Cited

U.S. PATENT DOCUMENTS

| | | | |
|---|---|---|---|
| 381,276 | 4/1888 | Parker | 137/533.13 |
| 1,652,542 | 12/1927 | Perry . | |
| 1,901,217 | 3/1933 | Yerkes et al. . | |
| 2,274,968 | 3/1942 | O'Bannon | 251/121 |
| 2,939,475 | 6/1960 | Roach | 137/533.13 |
| 3,633,599 | 1/1972 | Roos | 137/315 |
| 3,657,800 | 4/1972 | Hatala et al. | 29/470.3 |
| 3,724,496 | 4/1973 | Secrist | 137/533.11 |
| 3,905,718 | 9/1975 | Luckenbill et al. | 137/318 |
| 3,932,898 | 1/1976 | Wright | 137/533.15 |
| 4,079,491 | 3/1978 | Richardson | 29/157.1 R |
| 4,621,760 | 11/1986 | King et al. | 228/112 |
| 5,044,391 | 9/1991 | Brumfield | 137/533.11 |
| 5,178,184 | 1/1993 | Skillman | 137/553.13 |
| 5,450,871 | 9/1995 | Reinicke | 137/315 |

*Primary Examiner*—Denise L. Ferensic
*Assistant Examiner*—Joanne Y. Kim
*Attorney, Agent, or Firm*—Gardere & Wynne, L.L.P.; Lawrence R. Watson

[57] ABSTRACT

An improved cage assembly for ball check valves includes an insert comprising a unitary structure formed from STELLITE® having a passageway therethrough. A ball is positioned in the passageway of the insert for movement between two positions one of which secures the passageway against the flow of fluids therethrough. The insert is positioned in an insert receiving cavity formed in the lower end of an upstream housing. A downstream housing has a shoulder which engages the insert to secure the insert in the cavity. The downstream housing is secured to the upstream housing by friction welding or by inertia welding.

8 Claims, 1 Drawing Sheet

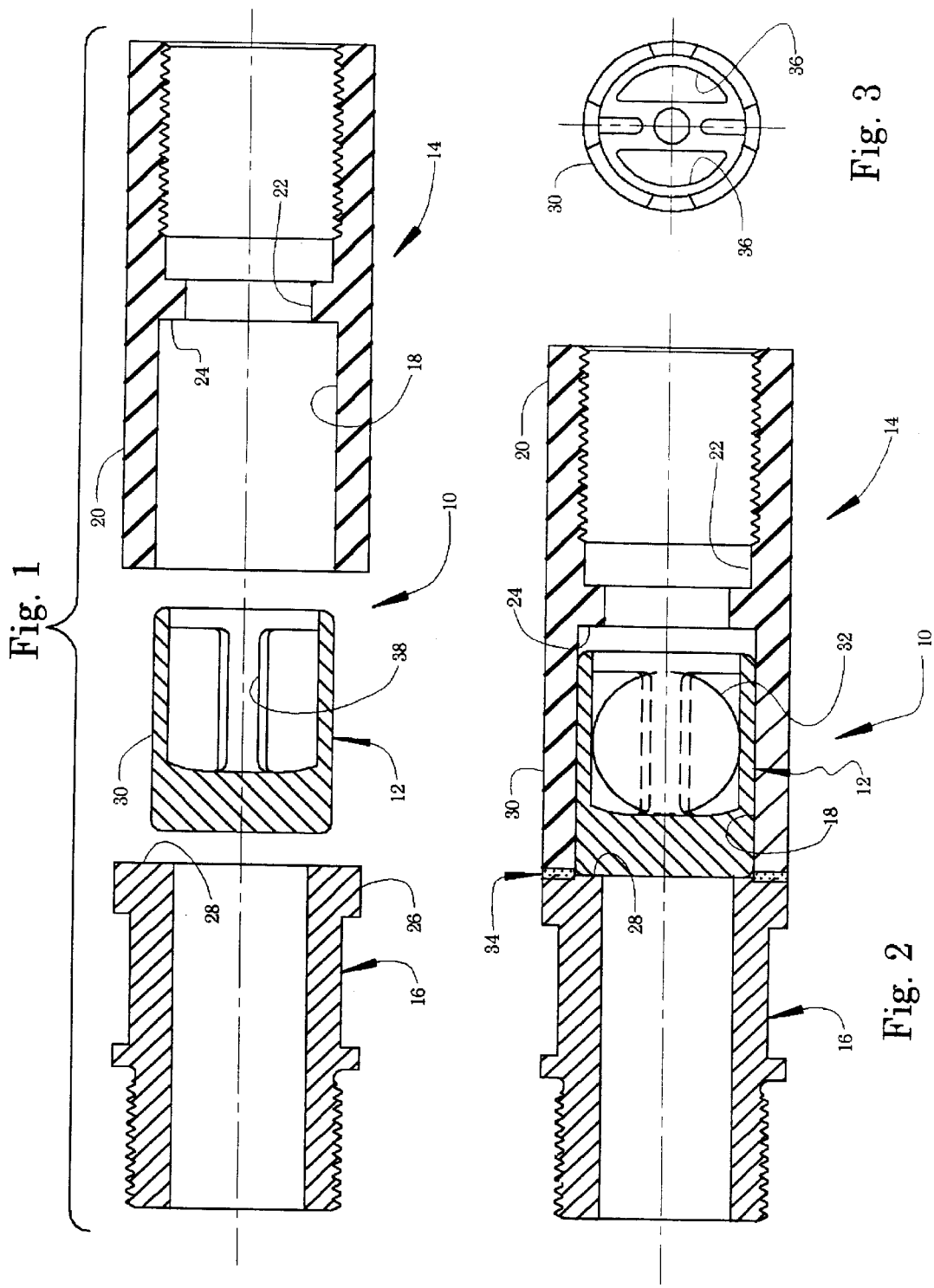

CAGE ASSEMBLY FOR BALL CHECK VALVES

TECHNICAL FIELD

This invention relates generally to ball check valves of the type used in down hole pumps, and more particularly to an improved cage assembly for ball check valves.

BACKGROUND AND SUMMARY OF THE INVENTION

As is well known, fluids such as crude oil, water, etc., are typically pumped from wells to the surface by means of down hole pumps. Perhaps the most widely utilized type of down hole pump includes a standing valve located at the bottom of the well and a traveling valve located above the standing valve for reciprocation under the action of a pumping unit. The standing valve and the traveling valve each include a ball check valve.

As the traveling valve is moved upwardly by the pumping unit, the ball check valve thereof closes thereby causing fluid situated above the traveling valve to be moved upwardly. Simultaneously, the ball check valve of the standing valve opens thereby allowing fluid to enter the portion of the well located between the standing valve and the traveling valve. As the traveling valve moves downwardly under the action of the pumping unit, the ball check valve thereof opens thereby allowing fluid to pass through the traveling valve so that it can be lifted upwardly upon the next reciprocation thereof. Meanwhile, the ball check valve of the standing valve closes thereby preventing downward movement of fluid therethrough.

Ball check valves typically include a cage and a ball positioned in the cage for reciprocation to open and close the valve. Heretofore, many ball check valves have utilized cage assemblies including components which are threadedly interconnected. It has been found that such threaded connections are prone to premature failure under the stresses imposed by pumping operations. Any such failure requires the removal of the down hole pump incorporating the ball check valve to the surface for disassembly and repair, a costly and time-consuming operation. The use of conventional welding techniques to join the component parts of the cage assembly of a ball check valve leads to similar problems.

The present invention comprises an improved cage assembly for ball check valves which overcomes the foregoing and other problems long since associated with the prior art. In accordance with the broader aspects of the invention, the cage assembly of a ball check valve includes a ball receiving insert formed from a hard, tough, wear-resistant material. The ball receiving insert is received in a cavity formed in the lower end of the upstream housing of the ball check valve assembly. The insert is retained in place by a shoulder formed on the downstream housing of the ball check valve assembly which is secured to the upstream housing by welding.

In accordance with more specific aspects of the invention, the insert preferably comprises a unitary, i.e., one-piece construction. The insert may be formed from the material sold under the trademark STELLITE®, however, other, similar materials may be used in the practice of the invention, if desired. The technique used to join the downstream housing to the upstream housing to the ball check valve assembly preferably comprises either inertia welding or friction welding.

BRIEF DESCRIPTION OF THE DRAWINGS

A more complete understanding of the invention may be had by reference to the following Detailed Description when taken in conjunction with the accompanying Drawings, wherein:

FIG. 1 is an exploded sectional view illustrating an improved cage assembly for ball check valves incorporating the preferred embodiment of the invention;

FIG. 2 is a sectional view of the improved cage assembly for ball check valves of FIG. 1 showing the ball check valve in its assembled configuration; and FIG. 3 is an end view of the insert of the improved cage assembly of FIG. 1.

DETAILED DESCRIPTION

Referring now to the Drawings, and particularly to FIG. 1 thereof, there is shown a ball check valve 10 including an improved cage assembly 12 comprising the preferred embodiment of the invention. The ball check valve 10 includes an upstream housing 14 and a downstream housing 16. The upstream housing 14 has a cage receiving cavity 18 formed at the lower end thereof which extends from the lower end 20 of the housing 14 to a flange 22 defining a shoulder 24. The downstream housing 16 includes a flange 26 which defines a shoulder 28 located at the upper end of the housing 16.

The cage assembly 12 includes an insert 30 which is formed from a hard, tough, wear-resistant material. Preferably, the insert 30 is formed from a material sold under the trademark STELLITE®, however, other, similar materials may be used in the practice of the invention, if desired. Importantly, the insert 30 is of unitary, i.e., one-piece construction. In this manner, the failures caused by the use of cage assemblies comprising multiple parts which are joined by threaded connections and/or conventional welding techniques are eliminated.

Referring to FIG. 2, the ball check valve 10 is shown in the assembled condition. Prior to assembly, a ball 32 is received in the insert 30. Thereafter, the insert 30 is received in the cavity 18 of the upstream housing 14. Thereafter, the downstream housing 16 is secured to the upstream housing 14 by a weldment 34. Importantly, the weldment 34 is formed either by inertia welding or by friction welding, both techniques being well known in the art.

When the joinder of the downstream housing 16 to the upstream housing 14 has been completed, the insert 30 is located in the cavity 18 by engagement of the shoulder 28 therewith. Excessive upward movement of the insert 30 in the cavity 18 is prevented by the shoulder 24.

Referring to FIG. 3, the insert 30 has D-shaped apertures 36 formed in the downstream end thereof. The apertures 36 are closed by engagement of the ball 32 with the downstream end of the insert 30. Upward movement of the ball 32 relative to the insert 30 opens the apertures 36 thereby allowing fluid to flow into the insert 30 and around the ball 32 through passageways 38 (FIG. 1).

Ball check valves incorporating the improved cage assembly of the present invention may be utilized in the standing valve of a down hole pump, or in the traveling valve thereof, or in both the standing valve and the traveling valve. Down hole pumps having ball check valves incorporating the improved cage assembly of the present invention may be utilized in the pumping of crude oil, water, and other fluids. Those skilled in the art will readily understand and appreciate other utilizations and applications of the present invention.

Although preferred embodiments of the invention have been illustrated in the accompanying Drawings and described in the foregoing Detailed Description, it will be understood that the invention is not limited to the embodiment disclosed, but is capable of numerous rearrangements, modifications, and substitutions of parts and elements without departing from the spirit of the invention.

I claim:

1. A cage assembly for ball check valves comprising:

an upstream housing having an insert receiving cavity formed in the lower end thereof and an interior shoulder defining the upper end of the cavity;

a one-piece, unitary insert positioned in the cavity of the upstream housing and having a passageway extending axially therethrough;

a ball positioned in the passageway of the insert and movable therein between two positions one of which closes the passageway against the movement of fluids therethrough;

a downstream housing having a shoulder defining the extremity of the upper end thereof; and a weldment securing the shoulder of the downstream housing to the lower end of the upstream housing so that the weldment of the downstream housing contacts the insert and limits downward movement of the insert relative to the cavity, the interior shoulder of the upstream housing limits upward movement of the insert relative to the cavity, and the insert prevents the ball from contacting the upstream housing within the cavity.

2. The cage assembly according to claim 1 wherein the insert is formed from a hard, tough, wear-resistant material.

3. The cage assembly according to claim 1 wherein the weldment is formed by inertia welding.

4. The cage assembly according to claim 1 wherein the weldment is formed by friction welding.

5. A method of manufacturing a cage assembly for ball check valves comprising:

providing a one-piece, unitary insert having a predetermined inside diameter and having a passageway extending axially therethrough;

providing a ball having an outside diameter substantially equal to the inside diameter of the passageway extending through the insert;

positioning the ball in the passageway of the insert for movement therein between two positions one of which secures the insert against the passage of fluids therethrough;

providing an upstream housing having an insert receiving cavity formed in the lower end thereof and an interior shoulder defining the upper end of the cavity;

positioning the insert with the ball mounted therein in the insert receiving cavity of the upstream housing;

providing a downstream housing having a shoulder defining the extremity of the upper end thereof; and securing the shoulder of the downstream housing to the upstream housing with a weldment, the weldment engaging the insert to prevent movement of the insert out of the cavity and so that the insert prevents the ball from contacting the upstream housing within the cavity.

6. The method of manufacturing an cage assembly according to claim 5 wherein the step of providing an insert is carried out by providing an insert comprising a unitary structure formed from a hard, tough, wear-resistant material.

7. The method of manufacturing an cage assembly according to claim 5 wherein the step of securing the downstream housing to the upstream housing is carried out by friction welding.

8. The method of manufacturing an cage assembly according to claim 5 wherein the step of securing the downstream housing to the upstream housing is carried out by inertia welding.

* * * * *